(12) United States Patent
Chen (10) Patent No.: US 7,464,409 B2
(45) Date of Patent: Dec. 9, 2008

(54) PERIMETER-BASED DEFENSE AGAINST DATA FLOODING IN A DATA COMMUNICATION NETWORK

(75) Inventor: Shigang Chen, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 908 days.

(21) Appl. No.: 10/877,437

(22) Filed: Jun. 25, 2004

(65) Prior Publication Data

US 2004/0264371 A1 Dec. 30, 2004

Related U.S. Application Data

(60) Provisional application No. 60/483,085, filed on Jun. 27, 2003.

(51) Int. Cl.
G06F 15/18 (2006.01)

(52) U.S. Cl. ...................................... 726/22

(58) Field of Classification Search .................... 726/22
See application file for complete search history.

(56) References Cited

U.S. PATENT DOCUMENTS

| 5,734,903 | A * | 3/1998 | Saulpaugh et al. .......... 719/316 |
| 6,321,338 | B1 * | 11/2001 | Porras et al. ................... 726/25 |
| 2002/0118796 | A1 * | 8/2002 | Menard et al. ................ 379/45 |
| 2003/0002436 | A1 | 1/2003 | Anderson et al. |
| 2003/0023733 | A1 | 1/2003 | Lingafelt et al. |
| 2004/0250124 | A1 * | 12/2004 | Chesla et al. ................ 713/201 |

OTHER PUBLICATIONS

Chen, S., et al., "Perimeter-Based Defense Against High Bandwidth DDoS Attacks", (Jul. 1, 2003).
Schuba, C.L., et al., "Analysis of a Denial of Service Attack on TCP", IEEE Sym. on Sec. and Privacy, (1997).
Lemon, J., et al., "Resisting SYN Flood DoS Attacks With a SYN Cache", Proc. of USENIX BSDCON2002, (Feb. 2002).
Wang, H., et al., "SYN-dog: Sniffing SYN Flooding Sources", Proc. of 22nd Int'l. Conf. on Dist. Com. Systems (ICDCS '02) (Jul. 2002).
Moore, D., "Inferring Internet Denial-Of-Service Activity", Proc. of USENIX Security Symposium 2001, (Aug. 2001).
Gibson, S., "The Strange Tale of the Denial fo Service Attacks Against GRC.COM", Gibson Research Corporation, (2002).

(Continued)

*Primary Examiner*—Benjamin E. Lanier
*Assistant Examiner*—Cordelia Kane
(74) *Attorney, Agent, or Firm*—Akerman Senterfitt; Gregory A. Nelson; Andrew C. Gust (57) ABSTRACT

A device for mitigating data flooding in a data communication network. The device can include a first module and a second module. The first module can identify flooding data transmitted from at least one offending host and intended for at least one threatened host. The second module can generate a data rate limit that is communicated to at least one of the plurality of edge nodes defining an entry node. The data rate limit can be based upon an observed rate of transmission of flooding data transmitted from the offending host to the entry node and a desired rate of transmission of flooding data transmitted to the threatened host from at least one other of the plurality of edge nodes defining an exit node.

18 Claims, 3 Drawing Sheets

OTHER PUBLICATIONS

Ferguson, P., et al., "RFC 2827—Network Ingress Filtering: Defeating Denial of Service Attacks Which Employ IP Source Address Spoofing", IETF, (Jan. 1998).

Park, K., et al., "On the Effectiveness of Route-Based Packet Filtering for Distributed DoS Attack Prevention in Power-Law Internets", ACM SIGCOMM 2001, (Aug. 2001).

Burch, H., "Tracing Anonymous Packets to Their Approximate Source", USENIX LISA '00, (Dec. 2000).

Schnackenberg, D., "Infrastructure for Intrusion Detection and Response", Proc. of 1st DARPA Info. Survivability Conf., (Jan. 2000).

Stone, R., "CenterTrack: An IP Overlay Network for Tracking DoS Floods", Proc. of USENIX Security Symp. '00, (Aug. 2000).

Savage, S., et al., "Practical Network Support for IP Traceback", Proc. of ACM SIGCOMM '2000, (Aug. 2000).

Song, D.X., et al., "Advanced and Authenticated Marking Schemes for IP Traceback", Proc. of IEEE INFOCOM '2001, (Mar. 2001).

Snoeren, A.C., et al., "Hash-Based IP Traceback", Proc. of ACM SIGCOMM '2001, (Aug. 2001).

Park, K., et al., "On the Effectiveness of Probabilistic Packet Marking for IP Traceback Under Denial of Service Attack", Proc. of IEEE INFOCOM '2001, (Mar. 2001).

Ratnasamy, S., et al., "Routing Algorithms for DHTs: Some Open Questions", Proc. of 1st Int'l WS on Peer-to-Peer Sys. (IPTPS'02), (Mar. 2002).

Mahajan, R., et al., "Controlling High Bandwidth Aggregates in the Network", Computer Communications Review, vol. 32, No. 3, pp. 62-73, (Jul. 2002).

Keromytis, A.D., et al., "SOS: Secure Overlay Services", Proc. of ACM SIGCOMM '2002, (Aug. 2002).

Gordon, G.W., "SYN Cookies, An Exploration", GSEC Practical Assignment, v. 1.3, from the web, (2000-2002).

* cited by examiner

PERIMETER-BASED DEFENSE AGAINST DATA FLOODING IN A DATA COMMUNICATION NETWORK

CROSS-REFERENCE TO RELATED APPLICATION

The present application claims priority to U.S. Provisional Application No. 60/483,085, filed Jun. 27, 2003, which is hereby incorporated by reference in its entirety.

FIELD OF THE INVENTION

The present invention relates to data communication networks, and, more particularly, to mitigating or avoiding excessive data flows in such networks.

BACKGROUND OF THE INVENTION

The expansion of the Internet and other data communications networks has been accompanied by an increase in the risk that such networks may experience data flooding. Data flooding, as the phrase implies, occurs when a host system connected to the network becomes partially or completely inoperable owing to its resources—processing capability, memory, physical links—being overwhelmed by a transmission of too much data too rapidly to the host system. With respect to data communication network security issues, in particular, data flooding underlies a wide range of security threats commonly referred to as denial-of-service (DoS) attacks.

One example of a DoS attack is SYN flooding in which an attacker floods a network server or other host system component with data in the form of transmission control protocol (TCP) SYN packets having so-called spoofed IP addresses. Unable to differentiate between legitimate SYN packets and spoofed SYN packets, the server completes the first two steps of the TCP's well-known three-way handshake procedure, but the third step is never completed by the attacker. Accordingly, the server is left with an ever-increasing number of open connections that can severely and indefinitely tie up the server's resources.

Yet another type of DoS attack is a distributed denial-of-service (DDoS) attack. In a DDoS attack, the attacker may initially obtain access to users' accounts on numerous hosts connected to the communication network (e.g., the Internet), for example, by "sniffing" passwords or breaking into users' accounts. The attacker can then install and run slave programs on the various compromised hosts. These slave programs, in turn, can generate large amounts of data that the attacker can direct at the attacked host to cause data flooding.

In recent years the number of such DoS attacks has risen, among them being some notorious ones against widely known Web sites such as those of Amazon, eBay, CNN, and Yahoo. Such attacks can cause significant economic losses, but yet, protecting against the attacks is difficult and costly. Current methods of packet filtering can be problematic because of difficulties, among others, in distinguishing between transmission of legitimate data and transmission of flooding data. Much of the current research into methods of mitigating DoS attacks focuses on techniques to combat spoofing, which, as noted above, is used to facilitate DDoS attacks. Other research has concentrated on ingress filtering, route-based packet filtering, and various IP traceback protocols.

The effectiveness of many, if not all, of these current safeguards against DoS attacks depends heavily on how widely deployed they are. Specifically, effectiveness can be severely diluted if, for example, only a few of the edge and core servers of the network are configured to implement one or more of the techniques described above. Moreover, even if current safeguards are widely deployed, there may yet be associated problems in terms of security, management, or efficiency. For example, with the aggregate-based congestion control (ACC) technique that has been proposed for rate-limiting data flooding from an identified source, a router congested by data flooding, sets a local rate limit that in a succession of steps is expanded to other routers—both edge and core routers—throughout the network. The result is a dynamic rate-limit tree that can be costly to maintain. More generally, no device or mechanism has been put forward to date that effectively and efficiently mitigates data flooding exclusively at the edge nodes of a data communication network.

SUMMARY OF THE INVENTION

With the foregoing discussion in mind, it is an object of the present invention to provide a system, device, and method for mitigating data flooding in a data communications network while also mitigating the loss of legitimate data and conserving resources of the network. The present invention provides a data communication system that includes a plurality of hosts, a plurality of edge nodes connected to the hosts, at least one core node connected to the edge nodes, and a plurality of coordinators connected to or implemented at the edge nodes. A coordinator identifies flooding data (typically in the form of data packets) transmitted from at least one of the hosts (defining an offending host) and intended for another of the hosts (defining a threatened host) and generates a data rate limit based on (a) an observed rate of transmission of flooding data transmitted from the offending host to the entry node and (b) a desired rate of transmission of flooding data transmitted to the threatened host from at least one other of the plurality of edge nodes defining an exit node. The data rate limit is communicated to at least one of the plurality of edge nodes defining an entry node, and, in turn the edge node implements a rate-limit filter based upon the communicated data rate limit.

In one embodiment, a plurality of edge nodes act as entry nodes. Based on the communicated rate limit, each of the entry nodes implements a coordinated rate-limit filter. In another embodiment, the rate limit is iteratively revised to efficiently and rapidly effect the desired rate of transmission of flooding data from the exit node to the threatened host.

In still another embodiment, the coordinator generates data traffic statistics that are updated periodically and may be used for setting at least one traffic-differentiation coefficient upon the basis of which the coordinated rate-limit filters may be revised. In yet another embodiment, the coordinator may determine which edge nodes define entry nodes and may generate for each such node a unique entry node n-tuple. Each n-tuple may include the data rate limit and an entry node coefficient, the data rate limit thus defining a unique entry node data rate limit for each entry node.

A method aspect of the present invention includes identifying, in response to a data flooding threat, flooding data transmitted from an offending host to at least one of the edge nodes (defining an entry node). The method further includes implementing a rate-limit filter at an entry node so as to limit the transmission of flooding data to the entry node. Moreover, if there are a plurality of edge nodes acting as entry nodes, then the method implements a plurality of coordinated rate-limit filters at each of the edge/entry nodes. Optionally, according to the method, the rate-limit filter may be successively modified by the updating of traffic-differentiation statistics.

BRIEF DESCRIPTION OF THE DRAWINGS

There are shown in the drawings, embodiments that are presently preferred; it being understood, however, that the invention is not limited to the precise arrangements and instrumentalities shown.

DETAILED DESCRIPTION OF THE PREFERRED EMBODIMENTS

The present invention is described more fully hereinafter with reference to the accompanying drawings, in which embodiments of the invention are illustrated. This invention, however, can be embodied in many different forms and should not be construed as limited to those set forth herein. Rather, the embodiments described are provided so that the disclosure will be thorough and complete, and so that it will fully convey to those skilled in the art the scope of the invention. Like numbers refer to like elements throughout the disclosure.

Figure 1:
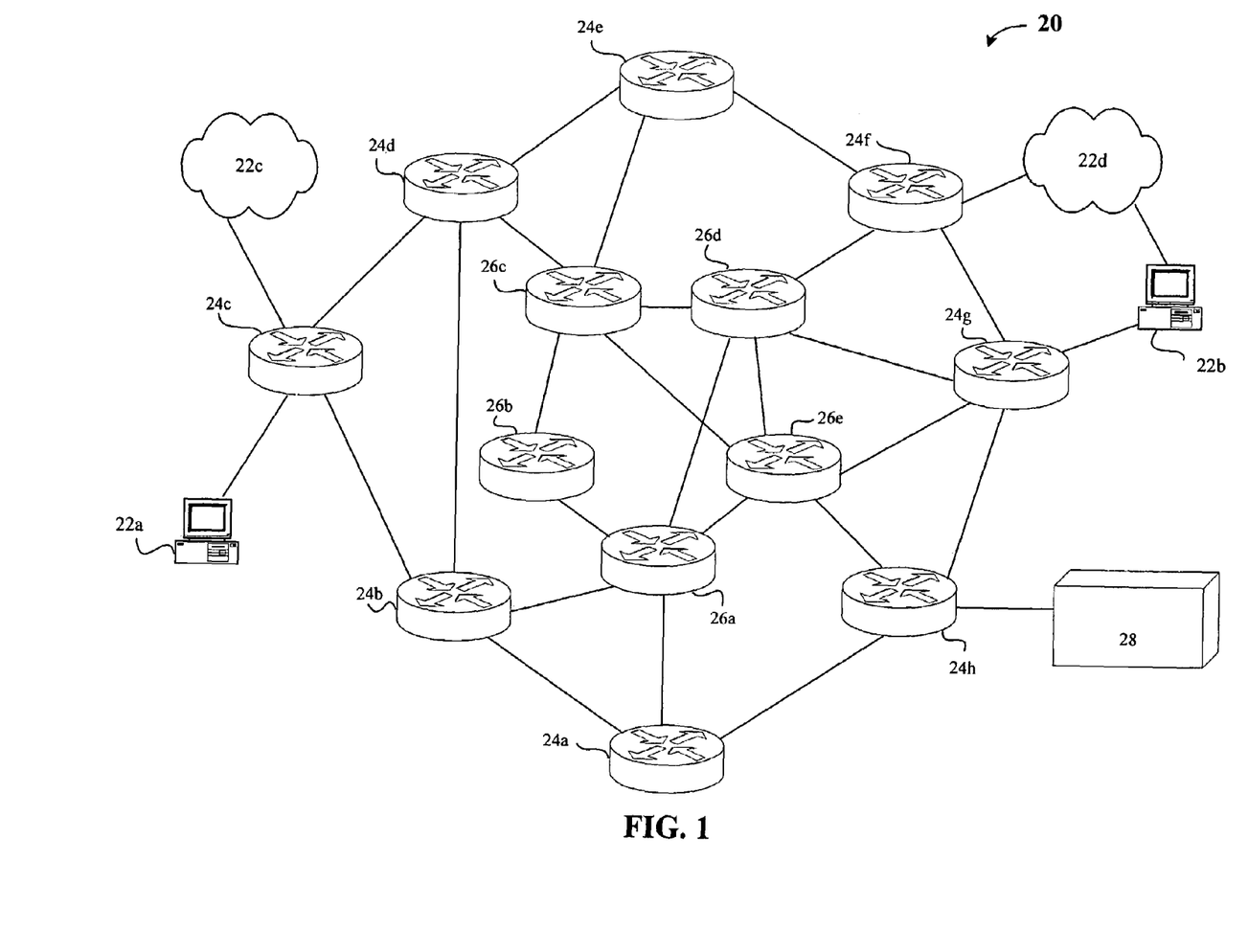
FIG. 1 is a schematic diagram of a system according to an embodiment disclosed herein.

FIG. 1 schematically shows system 20 for data communication according to an embodiment of the present invention. Illustratively, the system 20 comprises a data communication network having a plurality of hosts 22a-d, a plurality of edge nodes 24a-h connected to the hosts, at least one core node 26a-e connected to the edge nodes, and at least one coordinator 28 that is also connected to the edge nodes. The edge and core nodes 24a-h, 26a-e define an Internet service provider (ISP) network linking a plurality ISP customers defined by the hosts 22a-d. A host 22a, 22b, may be, for example, a general purpose computer. Alternatively, though, a host 22c, 22d may itself be a data communication network, such as another ISP network or a local area network (LAN) comprising servers, hubs, and/or bridges as will be readily understood by those skilled in the art. More generally, a host 22a-d may be any system or device capable of running at least application, transport, and network-layer programs.

In the context of the illustrated ISP network, the edge and core nodes 24a-h, 26a-e are each routers, but alternately may be other known packet switching devices. Such devices can be configured according to any network-layer protocol known to those skilled in the art. Accordingly, data communication within the network illustratively comprises the transmission of data in the form of segmented messages which are packetized according to a particular protocol, as will be readily understood by those skilled in the art.

The present invention is directed to mitigating data flooding in a data communications network. Accordingly, one aspect of this invention is a device referred to herein as a coordinator 28 that interacts with other elements of the system 20 in response to a threat of data flooding. The term data flooding is used herein to denote an excessive transmission of data, such as that associated with a DDoS attack, which threatens to overwhelm the resources of one or more elements of a data communication network. The coordinator 28 responds to a threat of data flooding by identifying flooding data that is transmitted from at least one of the plurality of hosts 22a, the at least one host defining an offending host, and is intended for another of the plurality of hosts 22b defining a threatened host. The coordinator 28 also responds by generating a data rate limit that is communicated to at least one of the plurality of edge nodes 24a-h, the at least one edge node defining an entry node.

Figure 2:
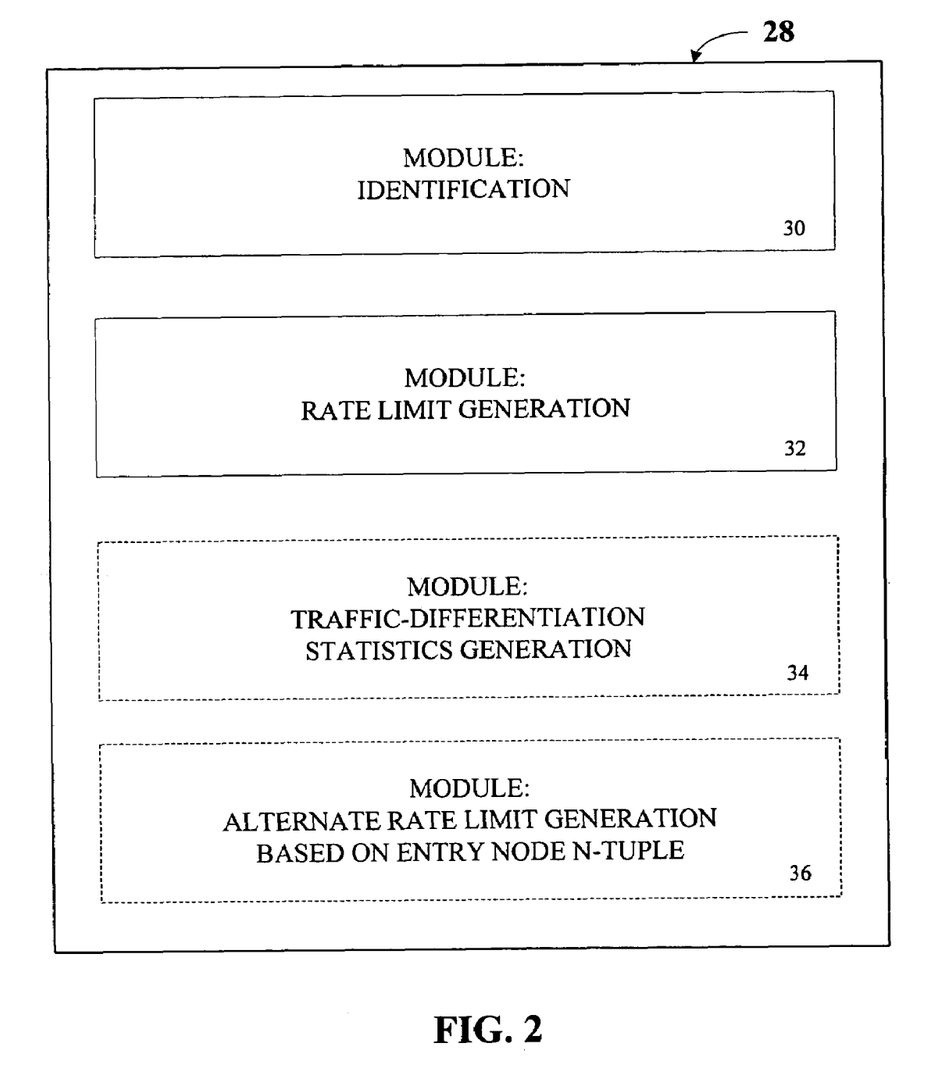
FIG. 2 a schematic diagram of a coordinator according to an embodiment disclosed herein.

As shown more particularly in the schematic of FIG. 2, the coordinator 28 illustratively includes a first module 30 to identify the flooding data and a second module 32 to generate the data rate limit. As will be readily understood by those skilled in the art both the first and second modules 30, 32 of the coordinator 28 may alternately be implemented in physical circuitry, in software running on a general purpose or special purpose computer (e.g., a server), or in a combination of the two. The coordinator 28 is illustrated herein as software configured to run on edge node 24h of the system 20.

The coordinator 28 preferably generates the data rate limit based on at least two distinct variables. The first is an observed rate of transmission of flooding data from the offending host 22b to at least one edge node 24a-h defining an entry node. This rate is defined herein as an acceptance rate, the rate being based on the rate that data packets (i.e., packetized segments of messages) arrive at and are transmitted to the data communication network by the entry node. The second variable on which the data rate limit is based is a desired rate of transmission of flooding data (also in the form of packets) to the host 22b defining a threatened host from at least one other of the plurality of edge nodes 24, the at least one other edge node defining an exit node. The actual rate that data is transmitted from the exit node to the threatened host is defined herein as an exit rate.

The data rate limit is communicated by the coordinator 28 to one or more of the plurality of edge nodes 24a-h that may receive flooding data from one or more offending hosts (each such node thus defining a distinct entry node as defined above). Each node to which the data rate limit has been communicated, in turn, uses the data rate limit to implement a rate-limit filter.

If more than one of the plurality of edge nodes 24a-h acts an entry node, then according one aspect of the invention, each of these entry nodes implements a unique rate-limit filter that comprises a coordinated rate-limit filter. These coordinated rate-limit filters cooperatively operate to set the rates of transmission of flooding data from the offending host to each entry node such that the aggregate amount of flooding data entering the data communication network leads to a desired rate of transmission of flooding data to the threatened host, as will be readily understood by those skilled in the art.

It should be appreciated that there are various ways of implementing the rate-limit filter, including through software stored and run on the edge nodes, and that the present invention is not to be limited in this regard. A software-based rate-limit filter can be generally represented as a 2-tuple, $<\alpha, \tau>$, where $\alpha$ designates the flooding data (e.g., data transmitted through an identified entry node or from an identified source), and where $\tau$ is the rate limit for such $\alpha$-designated data. One known type of rate-limit filter is the token-bucket, in which s is a bucket size and each rate-limit filter is assigned two variables: a counter, c, and a timestamp, t. The counter, c, is initialized to zero and the timestamp, t, is set equal to the system-clock. When flooding data, $\alpha$, is received (e.g., in the form of data packets or datagrams), the following algorithm is executed:

RateLimit(received data packet matches $\alpha$)
$c \leftarrow \min\{c+(\text{current clock value}-t) \times \tau, s\}$
$t \leftarrow$ current clock value
if ($c \geq$ packet size)

accept data packet
else
    drop data packet.

The system according to the present invention pursues two distinct objectives simultaneously: mitigating data flooding while also mitigating losses of legitimate data traffic. Thus, another aspect of the invention is the iterative revision of the data rate limit so as to block only so much flooding data as needed to achieve a desired data rate. Accordingly, the coordinator 28 monitors the rate that an edge node 24g defining an exit node transmits flooding data to the threatened host. The rate, as defined above is the exit rate, which may be denoted mathematically as $A(\alpha)$, where, again, $\alpha$ indicates the class of data corresponding to flooding data. By influencing the rate that the entry node accepts flooding data, $\alpha$, (the rate defined above as the acceptance rate) from an offending host, the device thus influences the exit rate, $A(\alpha)$; the latter rate is determined largely by the data rate limit, $\tau$, which is implemented as the rate-limit filter of the entry node 25b. Accordingly, the monitored exit rate, $A(\alpha)$, can be made to fall within a desired range by iteratively revising the data rate limit, $\tau$. Therefore, if the desired rate of transmission of flooding from the exit node to the threatened host is mathematically represented by the value $D(\alpha)$, then $\tau$ should be iteratively revised until $A(\alpha)$ falls within the range $(1-\epsilon)D(\alpha) \leq A(\alpha) \leq D(\alpha)(1+\epsilon)$, where $\epsilon$ corresponds to an acceptable error.

To illustrate, a two-phase iteration can be employed for making $A(\alpha)$ fall within the range $(1-\epsilon)D(\alpha) \leq A(\alpha) \leq D(\alpha)(1+\epsilon)$. In phase one, the coordinator 28 sets a least upper bound data rate limit corresponding to or based upon the desired rate of transmission of flooding data from the exit node to the threatened host; the least upper bound data rate limit is illustratively set equal to $D(\alpha)(1+\epsilon)$. If observed rate of transmission (i.e., the monitored exit rate, $A(\alpha)$, is greater than the least upper bound data rate, $D(\alpha)(1+\epsilon)$, then a first revised data rate limit $\tau'$ is generated, wherein $\tau'$ is significantly less than the data rate limit $\tau$ that was initially generated; for example, $\tau'$ can be made $\tau' = \tau \times \min\{D(\alpha)/A(\alpha), \frac{1}{2}\}$ so that the revised data rate limit is reduced at least by half its previous value. Subsequently, in phase two, after a predetermined interval T, if the observed rate of transmission (i.e., the monitored exit rate, $A(\alpha)$) is now less than the upper bound data rate, $D(\alpha)(1+\epsilon)$, then a second revised data rate limit $\tau''$ is generated; for example, $\tau''$ cab be made $\tau'' = \tau' \times D(\alpha)/A(\alpha)$. Thus, with this two-phase iterative process, the data rate limit initially undergoes a sharp reduction if it exceeds a least upper bound, and subsequently it undergoes a rapid increase until the observed rate of transmission (i.e., the monitored exit rate, $A(\alpha)$) lies within its desired limit.

In a first illustrative scenario, the coordinator 28 responds to a threat of data flooding in the form of a DDoS attack. The coordinator 28 may be responding to a request from a ISP customer. Alternately, the coordinator 28 may be responding to an intrusion detection device based on predetermined data rate transmission policies of the network, as will be readily understood by those skilled in the art. The coordinator 28 responds in this illustrative scenario by sending a multicast message identifying the flooding data and instructing the edge nodes 22a-h to implement rate-limit filters based on the data rate limit. In the current scenario, the edge nodes 25a-h are routers forming a multicast group, and each implements a rate-limit filter (if one is not already in place) in response to the multicast message.

In a DDoS attack against an ISP customer, an attacker only reaches the ISP customer by first introducing DDoS-induced flooding data into the ISP network through one or more of the network's edge routers. But because the edge routers effectively form a perimeter within which lie the core routers, the coordinator effectively mounts a perimeter-based defense against the DDoS attack without reliance on any of the core nodes. A distinct advantage of the perimeter-based defense is, of course, that the DDoS attack is blunted or halted at the perimeter. But, moreover, processing, memory, and related resources of the core nodes 24a-h need not be consumed in providing an effective defense against DDoS induced data flooding according to the present invention.

Optionally, the coordinator 28 may further comprise a third, additional module 34 for implementing a traffic-differentiation policy. A traffic-differentiation policy is based on a recognition that legitimate data traffic transmitted to the data communication network in the system 20 is often likely to exhibit different data transmission rates at distinct edge nodes 24a-h. More specifically, flooding data transmitted to an edge node 24c defining an entry node from a host 22a defining an offending host 22a is likely to be transmitted at a significantly higher rate of data transmission than that of legitimate data. Accordingly, this optional third module 34 of the coordinator 28 generates updatable data traffic statistics that can be communicated to and used by one or more edge nodes 24a-h acting as entry nodes for implementing a rate-limit filter that is consistent with a designated traffic-differentiation policy.

Moreover, according to the present invention, each edge node 24a-h may store a set of traffic differentiation policies governing implementation of its rate-limit filter, the policies being periodically amended based on the updatable traffic statistics generated by the optional third module 34 of the coordinator 28. For example, when the coordinator 28 communicates a data rate limit to an edge node 24c defining an entry node, the node can determine whether there is a traffic differentiation policy for the particular flooding data to which the data rate limit pertains. If not, the edge/entry node 24c implements a rate-limit filter equal to the data rate limit generated by the coordinator 28. Otherwise the edge/entry node 24c implements a rate-limit filter equal to the product of the data rate limit and a traffic-differentiation coefficient, c, based on the particular trade-differentiation policy in place. The value of the traffic-differentiation coefficient, c, is one or greater than one depending on the particular policy. The trade-differentiation policy may be applied broadly, encompassing, for example, all TCP traffic, or it may be applied narrowly, covering, for example, only HTTP traffic to a single designated server.

The present invention provides an alternative mechanism for generating a revised data limit that may be used in conjunction with or as an alternative to the mechanism already described above. Accordingly, the coordinator may optionally include yet a fourth module 36 for use whenever the at least one edge node 24c defining an entry node, in fact, is a plurality of entry nodes. The fourth additional module 36 identifies which of the plurality of edge nodes 24a-h, in fact, define entry nodes transmitting flooding data. For each such entry node, the fourth module 36 generates a unique set of entry node variables, which illustratively may be represented mathematically as an n-tuple. Illustratively, each such entry node n-tuple includes an entry node coefficient and the data rate limit, the data rate limit defining a unique entry node data rate limit. According to the present invention, the system 20 uses this information as part of a second mechanism (the first having already been described above) to iteratively revise the data rate limit as set forth in the following paragraphs.

As will be readily understood by those skilled in the art, an IP traceback mechanism may be employed in a data communication network to identify an edge node 24c that acts as an entry node. Specifically, when data is forwarded by the entry node, the address of the entry node is added to the data (i.e., an IP trace field containing the node's address is inserted in the data packet). The mechanism increases the overhead of the data (i.e., eight bytes per packet), however. Therefore, an alternative is to utilize the mechanism with respect to only a portion of the data transmitted by the entry node. Still another alternative is to use the mechanism only in response to an observed data flooding event (e.g., a detected DDoS attack).

Using one of these IP trace techniques, then, different packets of flooding data may be identified by the coordinator 28 on the basis of which edge node 24a-h transmitted the data into the data communication network. The fourth module 34 of the coordinator 28, accordingly, may also monitor the rate at which such data is admitted to the network (i.e., the acceptance rate defined above) at each such node. Illustratively, the coordinator 28 further may generate a table, each entry of which is the illustrative n-tuple described above. More particularly, the elements of each n-tuple illustratively include the address, e, of the specific entry node as well as the entry node's acceptance rate (designated here as $r_e$) and entry node coefficient (designated here as $c_e$). Note that when an edge node 24a-h becomes an entry node by transmitting flooding data, as described above, the coordinator 28 responds by creating a new table entry for that node.

Additionally, the coordinator 28 periodically updates each entry node's acceptance rate $\tau_e$ (e.g., updating may occur for a period T of 30 seconds). If, for example, the particular data communication network is configured such that each edge node 24a-h adds an IPtrace option to one of every k data packets, and if during the time interval, T, m packets are transmitted by an edge node 24c (thus defining an entry node), then that node's acceptance rate, $r_e$, may be estimated as mks/T, where s is an average data packet size.

Illustratively, the coordinator 28, at every time interval T, sets a base rate, r, if the following condition obtains: $A(\alpha) > D(\alpha)(1+\tau)$, where the inequality is the same as that defined above; otherwise no action is taken by the device. The base rate r is set such that $D(\alpha)(1-\tau) \leq \Sigma \min\{c_e r, r_e\} \leq D(\alpha)(1+\tau)$, where the summation is taken over the entire set of edge nodes 25a-c, designated herein as E. For example, r can be calculated using the following binary-search type of algorithm:

CalcBaseRate(E)
l←0
h←D($\alpha$)
r←(1+h)/2
while ($\Sigma \min\{c_e r, \tau_e\} < D(\alpha)(1-\tau)$ or $\Sigma \min > D(\alpha)(1+\tau)$)
if ($\Sigma \min\{c_e r, r_e\} < D(\alpha)(1-\tau)$)
    l←r
else
    h←r
r←(1+h)/2
return r Initially, the rate limit of each edge node 25a-c is set as $c_e r$, where as already noted $c_e$ is uniquely defined for each individual edge node. Subsequently each rate limit is revised it to be min$\{C_e r, \tau_e\}$ based on the above calculations that are illustratively done by the coordinator 28. The end result is that individual rate-limit filters implemented by the nodes are coordinated in the sense that through the iterative process and coordinated setting of rate limits, the exit rate, $A(\alpha)$, is made to lie within the following interval $[(1-\epsilon)D(\alpha), D(\alpha)(1+\epsilon)]$.

It should be noted that during an interval T, if for an individual edge node 25a-c, $r_e \leq c_e r$, then a rate-limit filter based on the rate limit $c_e r$ need not be implemented by the node since the rate of data transmitted through the node is accordingly less than the limit needed to achieve a desired rate of transmission of flooding data to the threatened host 23c.

In the context of an ISP network in which the edge nodes 24a-h are each routers, the coordinator 28 illustratively communicates a unique acceptance rate $r_e$ and coefficient $c_e$ to each router via a unicast message, as will be readily understood by those skilled in the art. Moreover, an edge node that has already implemented a rate-limit filter at the time that a unicast message is received will revise the rate-limit filter based on the new information contained in the unicast message. It will then send a message back to the coordinator 28 so that the coordinator's information may be updated. Accordingly, on the basis of the communicated information between the coordinator 28 and the edge nodes 24a-h defining entry nodes, each node implements a unique limit-rate filter based upon its own uniquely determined entry node data rate limit. Moreover, these edge node-specific rate-limit filters comprise coordinated rate-limit filters in that they operate cooperatively with one another so as to accept only that amount of flooding data that will ensure that a desired rate of transmission of flooding data from an exit node to the threatened host is achieved. Simultaneously, the loss of legitimate data is mitigated.

Figure 3:
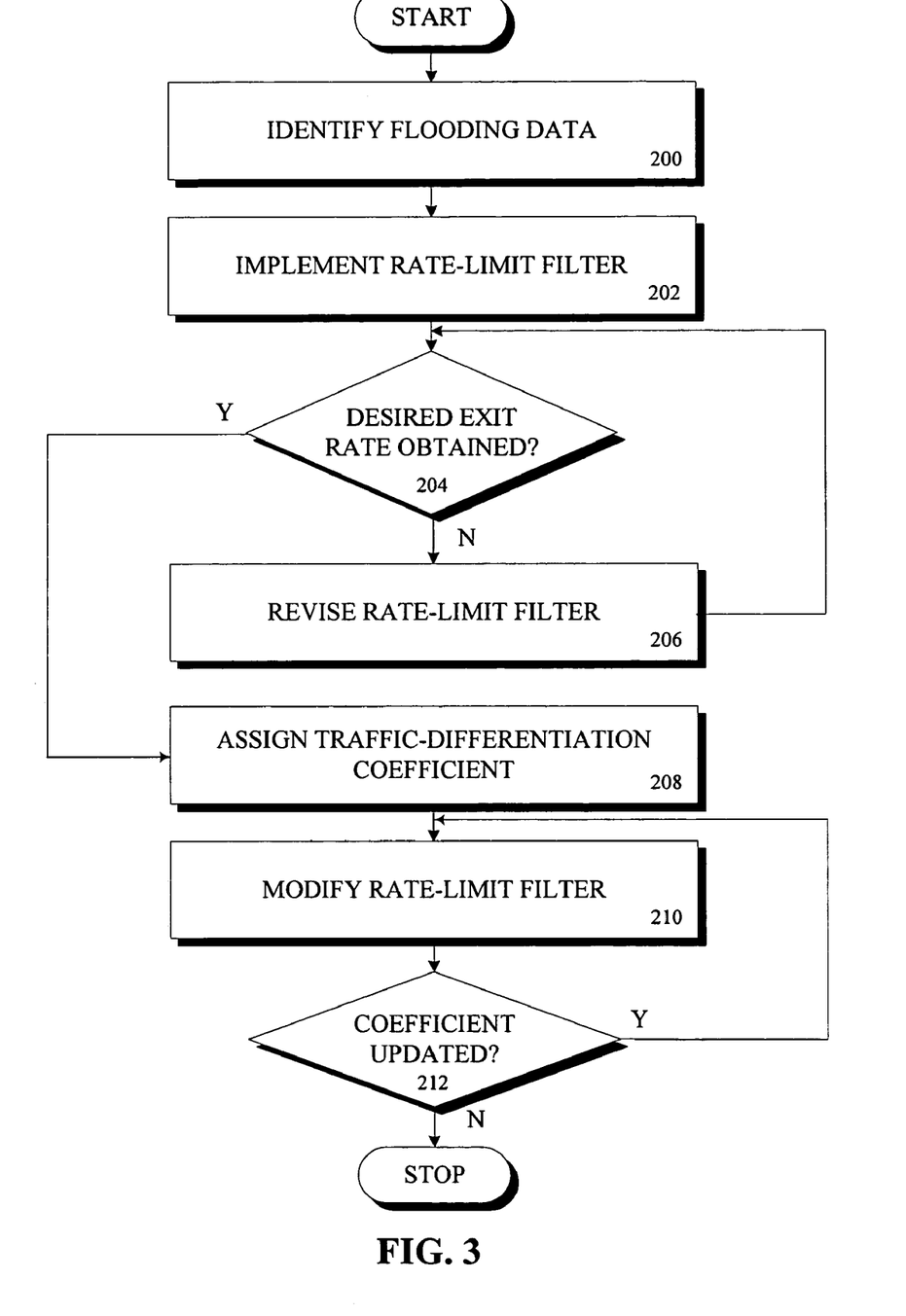
FIG. 3 provides a method according to an embodiment disclosed herein.

Referring now to the flowchart provided in FIG. 3, method aspects of the present invention are hereinafter described. Illustratively, a method according to this invention includes identifying, in response to a data flooding threat, flooding data transmitted from an offending host to at least one of the edge nodes (defining an entry node) of the system 20 (BLOCK 200). The illustrative method further includes implementing a rate-limit filter at the entry node (BLOCK 202), the rate-limit filter limiting the transmission of flooding data to the entry node and being based upon a desired rate of transmission of flooding data to the threatened host from the exit node. More particularly, if there are a plurality of edge nodes 24a-h acting as entry nodes, then the method implements a plurality of coordinated rate-limit filters at each of the edge/entry nodes, as described above.

At BLOCK 204, a determination is made according to the illustrated method as to whether the rate-limit filters thus implemented have effected a desired rate of transmission of flooding data to the threatened host. If not, the rate limit filter is iteratively revised (BLOCK 206). The illustrated method, moreover, may also include assigning a traffic-differentiation coefficient to the flooding data (BLOCK 208). If such a coefficient is assigned, then, the rate-limit filter may be modified on the basis of the traffic-differentiation coefficient (BLOCK 210). The traffic-differentiation coefficient may be updated on the basis of newly obtained traffic-differentiation statistics (BLOCK 212). Accordingly, whenever the traffic-differentiation coefficient is updated, the rate-limit filter may be modified anew, according to this method aspect of the invention.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form. This invention can be embodied in other forms without departing from the spirit or essential attributes thereof. Accordingly, reference should be made to the following claims, rather than to the foregoing specification, as indicating the scope of the invention.

What is claimed is:

1. A data communication system comprising:
   a plurality of hosts;
   a plurality of edge nodes;
   at least one core node; and
   a coordinator for
      identifying flooding data transmitted from at least one offending host and intended for at least one threatened host; and
      generating a data rate limit that is communicated to at least one of the plurality of edge nodes defining an entry node;
      the data rate limit being based upon (a) an observed rate of transmission of flooding data transmitted from the offending host to the entry node and (b) a desired rate of transmission of flooding data transmitted to the threatened host from at least one other of the plurality of edge nodes defining an exit node;
   wherein the coordinator (a) determines which of the plurality of edge nodes define entry nodes and (b) generates for each entry node a unique entry node n-tuple comprising the data rate limit and an entry node coefficient, the data rate limit thus defining a unique entry node data rate limit for each entry node;
   wherein the data rate limit is iteratively revised at each entry node by computing a base rate and setting the revised data rate limit equal to the minimum of the entry node data rate limit and the product of the base rate times the entry node coefficient.

2. The system of claim 1, wherein the entry node comprises a plurality of entry nodes, and wherein each of the entry nodes implements a coordinated rate-limit filter based upon the data rate limit.

3. The system of claim 1, wherein the coordinator iteratively revises the data rate limit by:
   setting a least upper bound data rate limit based on a desired rate of transmission of flooding data from the exit node to the threatened host;
   generating a revised data rate limit, defining a first revised data rate limit, that is substantially less than the data rate limit if transmission of flooding data from the exit node to the threatened host is greater than the least upper bound data rate limit; and
   subsequently generating a second revised data rate limit that is greater than the first revised data rate limit if the rate of transmission of flooding data from the exit node to the threatened host is less than the least upper bound data rate limit.

4. The system of claim 2, wherein the coordinator generates updatable data traffic statistics based upon rates of transmission of flooding data and for setting at least one traffic-differentiation coefficient; and wherein each coordinated rate-limit filter is based upon the at least one traffic-differentiation coefficient.

5. The system of claim 4, wherein the data communication network is an Internet service provider (ISP) network, the plurality of hosts are ISP customer networks, the at least one core node is a server, and the plurality of edge nodes are each servers that form a multicast group; and wherein the coordinator communicates the data rate limit to the plurality of edge nodes via a multicast message.

6. The system of claim 1, wherein the data communication network is an Internet service provider (ISP) network, the plurality of hosts are ISP customer networks, the edge nodes and at least one core node are each servers; and each entry node n-tuple is communicated to its corresponding entry node via a unicast message.

7. A device for mitigating data flooding in a data communication network having a plurality of hosts, a plurality of edge nodes connected to the plurality of hosts; and at least one core node connected to the plurality of edge nodes, the device comprising:
   processing circuitry;
   a first module configured to execute on said processing circuitry to identify flooding data transmitted from at least one offending host and intended for at least one threatened host;
   a second module configured to execute on said processing circuitry to generate a data rate limit that is communicated to at least one of the plurality of edge nodes defining an entry node, the data rate limit being based upon (a) an observed rate of transmission of flooding data transmitted from the offending host to the entry node and (b) a desired rate of transmission of flooding data transmitted to the threatened host from at least one other of the plurality of edge nodes defining an exit node; and
   a third module configured to execute on said processing circuitry for determining which of the plurality of edge nodes, defining entry nodes, is transmitting flooding data within the data communications network and generating for each entry node an entry node n-tuple comprising an entry node data rate limit based on the data rate limit and an entry node coefficient;
   wherein the data rate limit is configured to be iteratively revised at each entry node by computing a base rate and setting the revised data rate limit equal to the minimum of the entry node data rate limit and the product of the base rate times the entry node coefficient.

8. The device of claim 7, further comprising a third module for generating updatable data traffic statistics for setting at least one traffic-differentiation coefficient based upon the updatable data traffic statistics.

9. The device of claim 7, wherein the device iteratively revises the data rate limit by:
   setting a least upper bound data rate limit based on the desired rate of transmission of flooding data from the exit node to the threatened host;
   generating a revised data rate limit, defining a first revised data rate limit, that is substantially less than the data rate limit if transmission of flooding data from the exit node to the threatened host is greater than the least upper bound data rate limit; and
   subsequently generating a second revised data rate limit that is greater than the first revised data rate limit if the rate of transmission of flooding data from the exit node to the threatened host is less than the least upper bound data rate limit.

10. The device of claim 9, wherein the data communication network is an Internet service provider (ISP) network, the plurality of hosts are ISP customer networks, the at least one core node is a server, and the plurality of edge nodes are each servers that form a multicast group; and wherein the device communicates the data rate limit to the plurality of edge nodes via a multicast message.

11. The device of claim 7, wherein the data communication network is an Internet service provider (ISP) network, the plurality hosts are ISP customer networks, the edge nodes and at least one core node are each servers; and each entry node n-tuple is communicated to its corresponding entry node via a unicast message.

12. A method for mitigating data flooding, the method comprising:
in response to a data flooding threat within a data communication network having a plurality of hosts, a plurality of edge nodes connected to the hosts, and at least one core node connected to the edge nodes, identifying flooding data transmitted from an offending host to an entry node;
implementing a rate-limit filter at the entry node, the rate-limit filter limiting transmission of flooding data to the entry node based upon a desired rate of transmission of flooding data to the threatened host from an exit node;
generating for each entry node a unique entry node n-tuple comprising an entry node data rate limit and an entry node coefficient;
iteratively revising the data rate limit by computing a base rate and setting the revised data rate limit equal to the minimum of the entry node data rate limit and the product of the base rate times the entry node coefficient; and
iteratively revising the rate-limit filter based on the data rate limit.

13. The method of claim 12, wherein the entry node comprises a plurality of entry nodes, and wherein implementing a rate-limit filter comprises implementing a plurality of coordinated rate-limit filters at each of the plurality of entry nodes, the coordinated rate-limit filters cooperatively operating to achieve the desired rate of transmission of flooding data to the threatened host from the exit node.

14. The method of claim 12, further comprising iteratively revising the rate-limit filter so as to achieve a desired rate of transmission of flooding data to the threatened host.

15. The method of claim 12, further comprising assigning a traffic-differentiation coefficient to the flooding data and modifying the rate-limit filter based upon the traffic-differentiation coefficient.

16. The method of claim 12, further comprising iteratively revising the rate-limit filter by:
setting a least upper bound data rate limit based on the desired rate of transmission of flooding data from the exit node to the threatened host;
generating a revised data rate limit, defining a first revised data rate limit, that is substantially less than an initial data rate limit if transmission of flooding data from the exit node to the threatened host is greater than the least upper bound data rate limit; and
subsequently generating a second revised data rate limit that is greater than the first revised data rate limit if the rate of transmission of flooding data from the exit node to the threatened host is less than the least upper bound data rate limit.

17. A computer readable storage medium for use with a data communication network having a plurality of hosts, a plurality of edge nodes connected to the hosts, and at least one core node connected to the edge nodes, the storage medium comprising computer instructions for:
identifying flooding data transmitted from at least one of the plurality of hosts defining an offending host and intended for another of the plurality of hosts defining a threatened host;
generating a data rate limit that is communicated to at least one of the plurality of edge nodes defining an entry node, the data rate limit being based upon (a) an observed rate of transmission of flooding data transmitted from the offending host to the entry node and (b) a desired rate of transmission of flooding data transmitted to the threatened host from at least one other of the plurality of edge nodes defining an exit node;
generating for each entry node a unique entry node n-tuple comprising an entry node data rate limit and an entry node coefficient; and
iteratively revising the data rate limit by computing a base rate and setting the revised data rate limit equal to the minimum of the entry node data rate limit and the product of the base rate times the entry node coefficient.

18. The computer readable storage medium of claim 17 further comprising computer instructions for iteratively revising the data rate limit by:
setting a least upper bound data rate limit based on a desired rate of transmission of flooding data from the exit node to the threatened host;
generating a revised data rate limit, defining a first revised data rate limit, that is substantially less than the data rate limit if transmission of flooding data from the exit node to the threatened host is greater than the least upper bound data rate limit; and
subsequently generating a second revised data rate limit that is greater than the first revised data rate limit if the rate of transmission of flooding data from the exit node to the threatened host is less than the least upper bound data rate limit.

* * * * *